United States Patent
Chen et al.

(10) Patent No.: US 11,968,122 B2
(45) Date of Patent: Apr. 23, 2024

(54) JOINT OPTIMIZATION METHOD AND SYSTEM FOR DELAY AND SPECTRUM OCCUPATION IN CLOUD-EDGE COLLABORATIVE NETWORK

(71) Applicant: SOOCHOW UNIVERSITY, Suzhou (CN)

(72) Inventors: Bowen Chen, Suzhou (CN); Ling Liu, Suzhou (CN); Ruixin Liang, Suzhou (CN); Shoucui Wang, Suzhou (CN); Qi Chen, Suzhou (CN); Gangxiang Shen, Suzhou (CN); Mingyi Gao, Suzhou (CN); Weidong Shao, Suzhou (CN); Hong Chen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 17/915,257

(22) PCT Filed: Oct. 11, 2021

(86) PCT No.: PCT/CN2021/122981
§ 371 (c)(1),
(2) Date: Sep. 28, 2022

(87) PCT Pub. No.: WO2023/024219
PCT Pub. Date: Mar. 2, 2023

(65) Prior Publication Data
US 2023/0421501 A1     Dec. 28, 2023

(30) Foreign Application Priority Data
Aug. 24, 2021  (CN) .......................... 202110975856.0

(51) Int. Cl.
*G06F 13/00*     (2006.01)
*H04L 47/11*     (2022.01)
*H04L 47/2491*   (2022.01)

(52) U.S. Cl.
CPC .......... *H04L 47/11* (2013.01); *H04L 47/2491* (2013.01)

(58) Field of Classification Search
CPC ..... H04L 47/11; H04L 47/2491; H04L 47/24; H04L 47/10
(Continued)

(56) References Cited

U.S. PATENT DOCUMENTS 7,418,494 B2 *   8/2008  Dahlin ...................... H04L 9/40
                                                          709/224
8,099,492 B2 *   1/2012  Dahlin .................. H04L 69/329
                                                          709/224
(Continued)

FOREIGN PATENT DOCUMENTS

CN    110891093 A    3/2020
CN    111901424 A    11/2020

OTHER PUBLICATIONS

Ivana Kovacevic et al., "Cloud and Edge Computation Offloading for Latency Limited Services" IEEE Access vol. 9, pp. 55764-55776 (Apr. 16, 2021).
(Continued)

*Primary Examiner* — Kenneth R Coulter
(74) *Attorney, Agent, or Firm* — SZDC Law PC

(57) ABSTRACT

The present invention provides a joint optimization method and system for delay and spectrum occupation in a cloud-edge collaborative network. The method includes: initializing a cloud-edge collaborative network, and generating a set of user requests; establishing a target function of minimum average end-to-end delay and minimum spectrum slot occu-
(Continued)

pation of a user request; during processing of each user request based on the target function, sequentially determining whether a node and path selection uniqueness constraint, a mobile edge computing (MEC) server load constraint, a spectrum resource occupation and uniqueness constraint, a spectrum continuity constraint, and a spectrum consistency constraint are satisfied, where if all constraints are satisfied, the user request is successfully processed, and the process turns to step S4; or if any constraint is not satisfied, the user request fails to be processed; and calculating average end-to-end delay and spectrum resource occupancy of the user request.

10 Claims, 2 Drawing Sheets

(58) Field of Classification Search
USPC .................. 709/223, 222, 220, 221, 232
See application file for complete search history.

(56) References Cited

U.S. PATENT DOCUMENTS

| | | | | |
|---|---|---|---|---|
| 11,284,307 | B2* | 3/2022 | Khanka | ................ H04L 47/805 |
| 11,758,438 | B2* | 9/2023 | Khanka | ................ H04L 43/08 |
| | | | | 370/216 |
| 2018/0278679 | A1* | 9/2018 | Sahin | ................ H04L 67/1029 |
| 2020/0351337 | A1 | 11/2020 | Calmon et al. | |
| 2021/0321302 | A1* | 10/2021 | Khanka | ............... H04L 41/5009 |
| 2022/0191742 | A1* | 6/2022 | Khanka | ................ H04L 47/431 |

OTHER PUBLICATIONS

Ling Liu et al., "Network Resource Optimization with Latency Sensitivity in Collaborative Cloud-Edge Computing Networks" Asia Communications and Photonics Conference 2020 (Mar. 5, 2021).

Tang Lun et al., "Joint Resource Allocation Algorithms Based on Mixed Cloud/Fog Computing in Vehicular Network" Journal of Electronics & Information Technology, vol. 42, No. 8, pp. 1926-1933 (Aug. 31, 2020).

Tang Lun et al., "Task Offloading and Resource Allocation Algorithm Based on Lyapunov in Mobile Edge Computing" Computer Engineering, vol. 47, No. 3, pp. 29-36 (Mar. 31, 2021).

Yang Peng et al., "Latency Guarantee Model for Reliable Edge-Node Cooperation" Journal of Beijing University of Posts and Telecommunications, vol. 44, No. 2, pp. 47-53 (Apr. 30, 2021).

* cited by examiner

JOINT OPTIMIZATION METHOD AND SYSTEM FOR DELAY AND SPECTRUM OCCUPATION IN CLOUD-EDGE COLLABORATIVE NETWORK

This application is the National Stage Application of PCT/CN2021/122981, filed on Oct. 11, 2021, which claims priority to Chinese Patent Application No. 202110975856.0, filed on Aug. 24, 2021, which is incorporated by reference for all purposes as if fully set forth herein.

FIELD OF THE INVENTION

The present invention relates to the technical field of cloud-edge collaborative network optimization, and in particular, to a joint optimization method and system for delay and spectrum occupation in a cloud-edge collaborative network.

DESCRIPTION OF THE RELATED ART

In recent years, with the rapid development of Internet of Things (IoT), a large number of emerging application scenarios such as face recognition, smart cities, intelligent transportation systems, and virtual reality (VR) technology have emerged. As these application scenarios can bring higher bandwidth rates, more network connections, and lower latency to users, the volume of data and service requests that a core network needs to handle per unit time grow exponentially. As a result, with the increase in network traffic carried by mobile devices and IoT devices, in a centralized processing mode used in cloud computing, daily needs of users can no longer be met due to relatively long distances from terminal devices. In addition, for computing services with high performance requirements such as latency requirements and energy consumption requirements, this mode may cause problems such as high latency and network congestion.

To address these issues, the European Telecommunications Standards Institute (ETSI) has proposed mobile edge computing (MEC) by integrating edge computing into the architecture of a mobile network. The MEC is a new computing model that offloads computing tasks from mobile terminals to the edge of the network for computation and storage at the edge of the network. The MEC is considered as a key factor in the modern evolution of cellular base station models and the development of 5G technologies. The MEC brings computing and storage resources into the edge of the mobile network to reduce the computing latency and the energy consumption of terminal devices, thereby improving the quality of experience of mobile Internet applications for users and reducing the high load on a cloud computing center. Meanwhile, the MEC also requires the support of computing offload technology, which refers to the technology of uploading computing data from terminal devices to a cloud and performing a series of computing and processing. In the information era of Internet of everything, to achieve low latency of data transmission, low energy consumption of servers, high storage of mobile terminal resources, among others, complex computing tasks need to be offloaded to network edge servers for computing and processing.

To better combine the advantages of cloud computing and edge computing, as a new computing mode, cloud-edge collaboration has become a new research trend. With the increase of data-intensive applications and computation-intensive applications, it is necessary to utilize the powerful computing power of cloud computing as well as communication resources and the response characteristics of short-time transmission of edge computing for implementation to complete corresponding application requests. The value of the collaboration of edge computing and cloud computing is maximized through collaborative work and exploitation of respective strengths, thereby effectively improving the performance of applications. Currently, most of the research on cloud-edge collaboration is focused on application scenarios in many fields such as IoT, industrial Internet, intelligent transportation, and security monitoring. The main objectives are to reduce latency, reduce energy consumption, and improve the quality of user experience.

There are two main methods for offloading resources: offloading to a cloud and offloading to an edge. The offloading to a cloud allows users to offload computation-intensive tasks to cloud servers with powerful resources for processing. The offloading to an edge is deploying cloud services at the edge of a network. The offloading to a cloud cannot handle latency-sensitive applications adequately due to long transmission distances, and the offloading to an edge also requires consideration of computing resources, storage resources, energy consumption, and latency, among other factors. Therefore, how to offload services and to which end services are to be offloaded become current research hotspots.

SUMMARY OF THE INVENTION

For this, a technical problem to be resolved by the present invention is to overcome the problem in the prior art that end-to-end delay and spectrum resource occupancy of a user request are high, and provides a joint optimization method and system for delay and spectrum occupation in a cloud-edge collaborative network that effectively reduce end-to-end delay and spectrum resource occupancy of a user request.

To resolve the foregoing technical problems, a joint optimization method for delay and spectrum occupation in a cloud-edge collaborative network of the present invention includes the following steps: initializing a cloud-edge collaborative network, and generating a set of user requests; establishing a target function of minimum average end-to-end delay and minimum spectrum slot occupation of a user request; during processing of each user request based on the target function, sequentially determining whether a node and path selection uniqueness constraint, a MEC server load constraint, a spectrum resource occupation and uniqueness constraint, a spectrum continuity constraint, and a spectrum consistency constraint are satisfied, where if all the constraints are satisfied, the user request is successfully processed, and the process turns to step S4; or if any constraint is not satisfied, the user request fails to be processed; and calculating average end-to-end delay and spectrum resource occupancy of the user request.

In an embodiment of the present invention, during the initialization of the cloud-edge collaborative network, computing resources of an edge computing server are initialized, and a spectrum-flexible optical network is initialized.

In an embodiment of the present invention, the target function includes a primary optimization target and a secondary optimization target.

In an embodiment of the present invention, a formula of the target function is:

$$G = \alpha \times \frac{1}{|CR|} \left\{ \sum_{(u,s) \in CR}^{e \in E, k \in K} x_{(u,s)}^{e,k} \left( \frac{R_{(u,s)}}{M_e} + \frac{W_{(u,s),(k,l)}^{e,k}}{c} \right) + \sum_{(u,s) \in CR} y_{(u,s)} \times \tau \right\} +$$

$$\beta \times \sum_{(k,l) \in L, f \in F}^{e \in E, (u,s) \in CR} w_{(u,s)(k,l)}^{e,f},  \quad 5$$

where |CR| represents a total quantity of the user requests, and CR is a set of user requests; $x_{(u,s)}^{e,k}$ is a binary variable, if a user request (u, s) is processed at a MEC server node e and the user request is transmitted through a $k^{th}$ path, where E represents a set of MEC servers, a value of the binary variable is 1, or otherwise the value is 0; $R_{(u,s)}$ represents a quantity of computing resources required for transmitting the user request (u, s); $M_e$ is a computing resource capability of the MEC server node e; $W_{(u,s),(k,l)}^{e,k}$ represents a distance of a link (k, l) through which a $k^{th}$ working path of transmitting the user request (u, s) from a node s to the MEC server node e, $\Sigma_{e \in E, k \in K} x_{(u,s)}^{e,k}=1$, $\forall$(u, s)∈CR, $\Sigma_{e \in E, k \in K} x_{(u,s)}^{e,k}=y_{(u,s)}$, $\forall$(u, s)∈CR, and K represents a set of k paths; c represents a transmission rate of the user request in an optical fiber link, and is set to 3×10⁵ km/s; and $y_{(u, s)}$ is a binary variable, if the user request (u, s) is migrated to a second layer, that is, a MEC server node e in a cloud area for processing, a value of the binary variable is 1, or otherwise the value is 0; τ is extra switch delay of transmitting the user request to the cloud area through a switch, α and β are parameters, $w_{(u,s)(k,l)}^{e,f}$ is a binary variable, and if the user request (u, s) is transmitted to the MEC server node e and a spectrum slot with a sequence number of f of the link (k, l) is occupied, a value of the binary variable is 1, or otherwise the value is 0.

In an embodiment of the present invention, the node and path selection uniqueness constraint is: $\Sigma_{e \in E, k \in K} x_{(u,s)}^{e,k}=1$, $\forall$(u, s)∈CR, $\Sigma_{e \in E, k \in K} x_{(u,s)}^{e,k}=y_{(u,s)}$, $\forall$(u, s)∈CR, where $x_{(u,s)}^{e,k}$ is a binary variable, if the user request (u, s) is processed at the MEC server node e and the user request is transmitted through the $k^{th}$ path, a value of the binary variable is 1, or otherwise the value is 0, $y_{(u,s)}$ is a binary variable, and if the user request (u, s) is migrated to the second layer, that is, the MEC server node e in the cloud area for processing, a value of the binary variable is 1, or otherwise the value is 0.

In an embodiment of the present invention, the MEC server load constraint is $\Sigma_{(u,s) \in CR, k \in K} x_{(u,s)}^{e,k} \times R_{(u,s)} \leq \varphi$, $\forall e \in E$, $\varphi \leq V_e$, $\forall e \in E$, where $R_{(u,s)}$ represents the quantity of computing resources required for transmitting the user request (u, s), φ represents maximum load of a server, and V e represents maximum computing resource capacity of the MEC server node e.

In an embodiment of the present invention, the spectrum resource occupation and uniqueness constraint is: $\Sigma_{e \in E, f \in F, (u,s) \in CR} w_{(u,s)(k,l)}^{e,f} \leq |F_{(k,l)}|$, $\forall$(k,l)∈L; $\Sigma_{f \in F} w_{(u,s)(k,l)}^{e,f} = \Sigma_{k \in K} x_{(u,s)}^{e,k} \times P_{(u,s),(k,l)}^{e,k} \times F_{(u,s)}$, $\forall$(u, s)∈CR, e∈E, (k,l)∈L; $\Sigma_{e \in E, (u,s) \in CR} w_{(u,s)(k,l)}^{e,f} \leq 1$, $\forall$(k,l)∈L, f∈F.

where $|F_{(k,l)}|$ represents a maximum spectrum slot quantity on the link (k, l), it is assumed that each link is allowed to provide the same maximum spectrum slot quantity, $P_{(u,s),(k,l)}^{e,k}$ represents an optical fiber link (k, l) through which the $k^{th}$ working path of transmitting the user request (u, s) from the node s to the MEC server node e passes, and $F_{(u,s)}$ represents a quantity of spectrum slots required for transmitting the user request (u, s).

In an embodiment of the present invention, the spectrum continuity constraint is: $(w_{(u,s)(k,l)}^{e,f} - w_{(u,s)(k,l)}^{e,f+1} - 1) \times$ $(-\theta) \geq \Sigma_{z \in [f+2, |F_{(k,l)}|]} w_{(u,s)(k,l)}^{e,z}$; $(w_{(u,s)(k,l)}^{e,f}-1) \times \theta + F_{(u,s)} \leq \Sigma_{f \in F} w_{(u,s)(k,l)}^{e,f}$ $\forall$(u, s)∈CR, (k,l)∈L, f∈F;

$\theta = |F_{(k,l)}| \times |L|$, where θ represents a total spectrum quantity of the entire network, and is equal to a product of multiplying a total link quantity by link spectrum slot capacity.

In an embodiment of the present invention, the spectrum continuity constraint is $\Sigma_{f \in F} w_{(u,s)(k,l)}^{e,f} = F_{(u,s)}$, $\forall$(u,s)∈CR, (k, l)∈L, where $F_{(u,s)}$ represents a quantity of spectrum slots required for transmitting the user request (u, s).

The present invention further provides a joint optimization system for delay and spectrum occupation in a cloud-edge collaborative network, including: an initialization module, configured to initialize a cloud-edge collaborative network, and generate a set of user requests; a modeling module, configured to establish a target function of minimum average end-to-end delay and minimum spectrum slot occupation of a user request; a determination module, configured to sequentially determine, during processing of each user request based on the target function, whether a node and path selection uniqueness constraint, a MEC server load constraint, a spectrum resource occupation and uniqueness constraint, a spectrum continuity constraint, and a spectrum consistency constraint are satisfied, where if all the constraints are satisfied, the user request is successfully processed, and the process turns to step S4; or if any constraint is not satisfied, the user request fails to be processed; and a calculation module, configured to calculate average end-to-end delay and spectrum resource occupancy of the user request.

Compared with the prior art, the foregoing technical solution of the present invention has the following advantages:

The joint optimization method and system for delay and spectrum occupation in a cloud-edge collaborative network in the present invention mainly resolve the problem of how to select an appropriate MEC server to process user requests in a cloud-edge collaborative network. The processing time of services in cloud computing is excessively long and as a result cannot meet the demand of short delay for services. In edge computing, although servers are deployed on a user side, computing resources are insufficient to process services with a large volume of data. Therefore, cloud computing and edge computing are combined to propose a cloud-edge collaborative network as an effective way to process services. The present invention proposes an evaluation mechanism for end-to-end delay as well as spectrum resource occupation, and then establishes a joint optimization method with a target function of minimum average end-to-end delay and minimum spectrum slot occupation of a user request according to this mechanism, and an integer linear programming method is used to implement a resource allocation method for computation offloading, routing, and spectrum allocation in a cloud-edge collaborative network. A set of user requests is generated in a static cloud-edge collaborative network, and corresponding requirements of computation resources and spectrum resources are set. Then, according to constraints and optimization targets, an optimization target method with the minimum end-to-end delay and minimum spectrum occupation is established, to find optimal MEC servers all user requests to process and allocate resources.

The present invention may select an optimal MEC server to process user requests, so that data processing delay and data transmission delay generated from processing user requests are greatly reduced, thereby improving the quality of service for users. In addition, a search is performed for a shortest working path for each user request to reduce the waste of spectrum resources in a network, thereby greatly improving the utilization of spectrum resources.

BRIEF DESCRIPTION OF THE DRAWINGS

To make the content of the present invention clearer and more comprehensible, the present invention is further described in detail below according to specific embodiments of the present invention and the accompanying draws. Where.

DETAILED DESCRIPTION OF THE PREFERRED EMBODIMENTS

Embodiment 1

Figure 1:
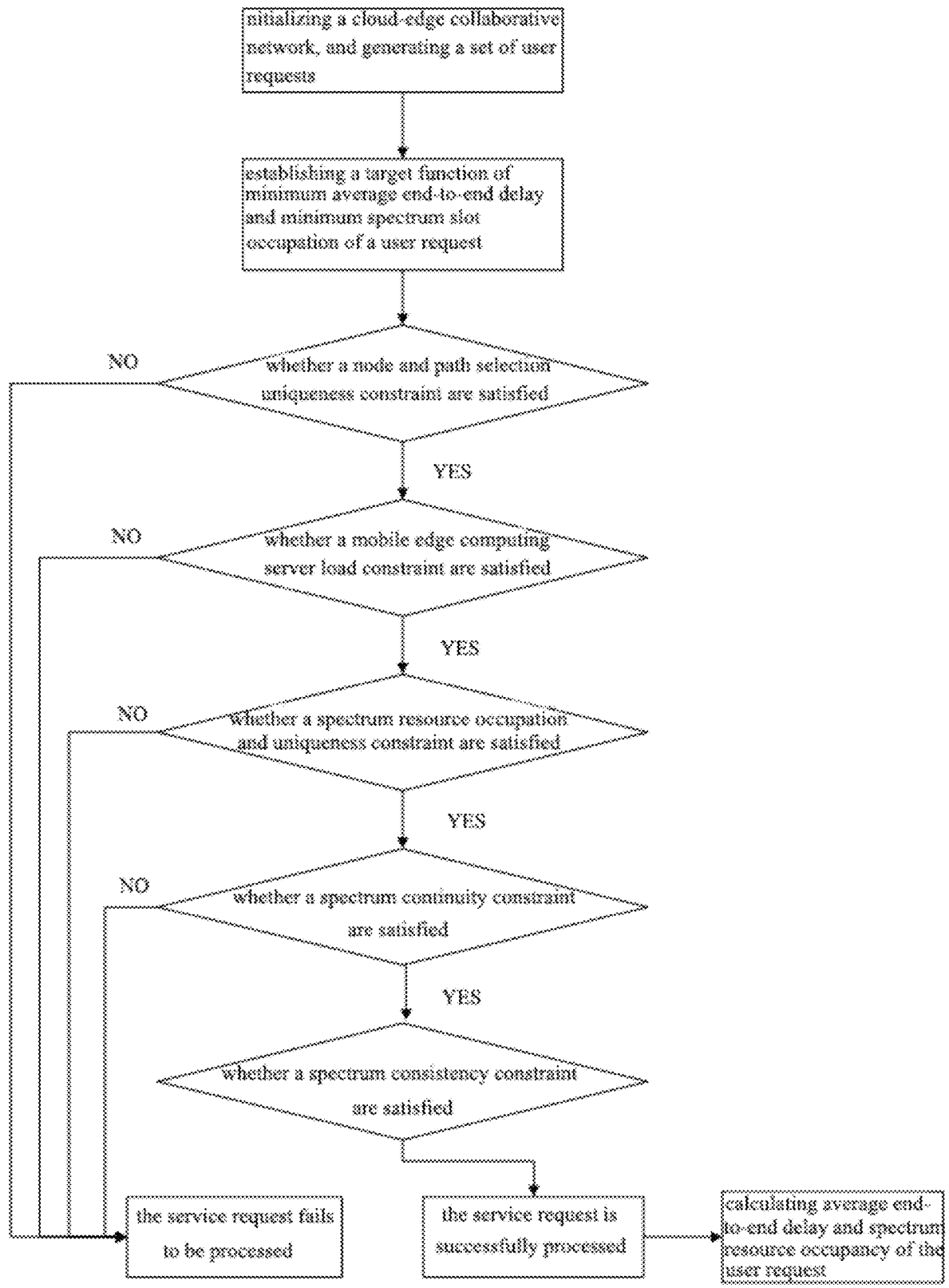
FIG. 1 is a flowchart of a joint optimization method for delay and spectrum occupation in a cloud-edge collaborative network according to the present invention.

As shown in FIG. 1, this embodiment further provides a joint optimization method for delay and spectrum occupation in a cloud-edge collaborative network, including: step S1: initializing a cloud-edge collaborative network, and generating a set of user requests; step S2: establishing a target function of minimum average end-to-end delay and minimum spectrum slot occupation of a user request; step S3: during processing of each user request based on the target function, sequentially determining whether a node and path selection uniqueness constraint, a MEC server load constraint, a spectrum resource occupation and uniqueness constraint, a spectrum continuity constraint, and a spectrum consistency constraint are satisfied, where if all the constraints are satisfied, the user request is successfully processed, and the process turns to step S4; or if any constraint is not satisfied, the user request fails to be processed; and step S4: calculating average end-to-end delay and spectrum resource occupancy of the user request.

For the joint optimization method for delay and spectrum occupation in a cloud-edge collaborative network in this embodiment, in step S1, a cloud-edge collaborative network is initialized, and a set of user requests is generated, which helps to establish a target function. In step S2, a target function of minimum average end-to-end delay and minimum spectrum slot occupation of a user request is established, which helps to implement an optimization solution with a target of minimum delay and spectrum occupation. In step S3, it is sequentially determined, during processing of each user request based on the target function, whether a node and path selection uniqueness constraint, a MEC server load constraint, a spectrum resource occupation and uniqueness constraint, a spectrum continuity constraint, and a spectrum consistency constraint are satisfied, where if all the constraints are satisfied, the user request is successfully processed, and the process turns to step S4; or if any constraint is not satisfied, the user request fails to be processed, which helps to implement resource allocation for computation offloading, routing, and spectrum allocation in a cloud-edge collaborative network and reduce end-to-end delay and spectrum resource occupancy of a user request. In step S4, average end-to-end delay and spectrum resource occupancy of the user request are calculated, to find optimal MEC processors for all user requests to process and allocate resources. The present invention may select an optimal MEC server to process user requests, so that data processing delay and data transmission delay generated from processing user requests are greatly reduced, thereby improving the quality of service for users. In addition, a search is performed for a shortest working path for each user request to reduce the waste of spectrum resources in a network, thereby greatly improving the utilization of spectrum resources.

In the present invention, end-to-end delay of a user request in a cloud-edge collaborative network is mainly formed by network transmission delay and computing resource delay. The network transmission delay refers to the length of a shortest path between a service area of a user and an edge computing server, and is calculated by using accumulated delay of link delay of the shortest path. The computing resource delay is related to a computing resource requirement of each user and a computing capability of an edge computing server. End-to-end delay in three cases of processing user requests is mainly considered in the present invention, including local processing, offloading to another area connected to a switch, and offloading to a cloud area connected to a switch. A formula of the average end-to-end delay of a user request is as follows:

$$\frac{1}{|CR|}\left\{\sum_{e \in E, k \in K, (u,s) \in CR} x_{(u,s)}^{e,k}\left(\frac{R_{(u,s)}}{M_e} + \frac{W_{(u,s),(k,l)}^{e,k}}{c}\right) + \sum_{(u,s) \in CR} y_{(u,s)} \times \tau\right\}, \quad (1)$$

where $|CR|$ represents a total quantity of the user requests, and CR is a set of user requests; $x_{(u,s)}^{e,k}$ is a binary variable, if a user request $(u, s)$ is processed at a MEC server node $e$ and the user request is transmitted through a $k^{th}$ path, where E represents a set of MEC servers, a value of the binary variable is 1, or otherwise the value is 0; $R_{(u,s)}$ represents a quantity of computing resources required for transmitting the user request $(u, s)$; $M_e$ is a computing resource capability of the MEC server node $e$; $W_{(u,s),(k,l)}^{e,k}$ represents a distance of a link $(k, l)$ through which a $k^{th}$ working path of transmitting the user request $(u, s)$ from a node $s$ to the MEC server node $e$, and K represents a set of k paths; c represents a transmission rate of the user request in an optical fiber link, and is set to $3\times10^5$ km/s; and $y_{(u,s)}$ is a binary variable, if the user request $(u, s)$ is migrated to a second layer, that is, a MEC server node $e$ in a cloud area for processing, a value of the binary variable is 1, or otherwise the value is 0; and $\tau$ is extra switch delay of transmitting the user request to the cloud area through a switch.

The spectrum resource occupancy refers to a ratio of dividing a total quantity of spectrum slots occupied by working paths of all user requests by a quantity of spectrum slots of all links, and a specific calculation formula is as follows:

$$OR = \frac{\sum_{(u,s) \in CR} F_{(u,s)}}{LN \cdot SN}, \quad (2)$$

where $F_{(u,s)}$ represents a spectrum resource requirement of a user request u, CR is a set of user requests, and LN and SN respectively represent a total quantity of links and a spectrum resource capacity of each link.

To resolve the problem of how to select an appropriate server to process a service in a cloud-edge collaborative network, based on the foregoing estimation mechanism of delay and spectrum occupation, the present invention proposes an integer linear programming method. That is, an optimization solution with a target of minimum delay and spectrum occupation is implemented in a static network.

In step S1, during the initialization of the cloud-edge collaborative network, computing resources of an edge computing server are initialized, and a spectrum-flexible optical network is initialized. In a cloud-edge collaborative network G (CR, E), CR={1, 2, . . . , (u,s), . . . } represents a set of user requests, and E={1, 2, . . . , e, . . . } represents a set of edge computing server nodes. For each user request CR(u, s)∈CR, u represents a sequence number of the user request, and s represents a source node generating the user request.

In step S2, during the establishment of the target function of minimum average end-to-end delay and minimum spectrum slot occupation of the user request, because the present invention mainly resolves the problem of how to select an appropriate edge computing server to process a service in a cloud-edge collaborative network, the target function of joint optimization minimizes the average end-to-end delay and the spectrum resource occupancy of the user request in the cloud-edge collaborative network. That is, the target function is formed by two parts: a primary optimization target and a secondary optimization target, and the weights of the optimization targets may be changed by changing the values of the parameters $\alpha$ and $\beta$ ($0 \leq \alpha$, $\beta \leq 1$), to achieve different optimization objectives. When $\alpha=1$ and $\beta=0$, the optimization target is changed to reach the minimum value of average end-to-end delay in the network. When $\alpha=0$ and $\beta=1$, the optimization target is used for optimizing the spectrum resource occupancy in the network, thereby optimizing the spectrum utilization in the network.

The optimized target function may be represented by using the following formula:
minimize:

$$G = \alpha \times \frac{1}{|CR|} \left\{ \sum_{(u,s) \in CR}^{e \in E, k \in K} x_{(u,s)}^{e,k} \left( \frac{R_{(u,s)}}{M_e} + \frac{W_{(u,s),(k,l)}^{e,k}}{c} \right) + \sum_{(u,s) \in CR} y_{(u,s)} \times \tau \right\} + \beta \times \sum_{(k,l) \in L, f \in F}^{e \in E, (u,s) \in CR} w_{(u,s)(k,l)}^{e,f},$$ (3)

where the target G of the integer linear programming model is to minimize the average end-to-end delay and a quantity of occupied spectrum slots in the cloud-edge collaborative network. In Formula (3), the first part represents the average end-to-end delay of the user request. A specific evaluation method is shown in Formula (1). Through optimization, an appropriate server is selected to reduce the processing delay and the transmission delay for users. The second part represents a total quantity of spectrum slots occupied in the cloud-edge collaborative network. $w_{(u,s)(k,l)}^{e,f}$ is optimized to reduce a quantity of spectrum slots occupied by a connection request. $w_{(u,s)(k,l)}^{e,f}$ is a binary variable, and if the user request (u, s) is transmitted to the MEC server node e and a spectrum slot with a sequence number of f of the link (k, l) is occupied, a value of the binary variable is 1, or otherwise the value is 0.

In step S3, based on the target function, constraint conditions satisfying an optimization method with a target function are established.

When it is requested to allocate an appropriate MEC server for a user for processing, a node and a link need to satisfy the following conditions:

The node and path selection uniqueness constraint is:

$$\sum_{e \in E, k \in K} x_{(u,s)}^{e,k} = 1, \forall (u,s) \in CR \quad (4),$$

$$\sum_{e \in E, k \in K} x_{(u,s)}^{e,k} = y_{(u,s)}, \forall (u,s) \in CR \quad (5),$$

where $x_{(u,s)}^{e,k}$ is a binary variable, if the user request (u, s) is processed at the MEC server node e and the user request is transmitted through the $k^{th}$ path, a value of the binary variable is 1, or otherwise the value is 0. $y_{(u,s)}$ is a binary variable, and if the user request (u, s) is migrated to the second layer, that is, the MEC server node e in the cloud area for processing, a value of the binary variable is 1, or otherwise the value is 0. Formulas (4) and (5) ensure that one user request can only be processed by one server. For each user request, one path is selected from the k working paths to transmit the user request.

The MEC server load constraint is:

$$\sum_{(u,s) \in CR, k \in K} x_{(u,s)}^{e,k} \times R_{(u,s)} \leq \varphi, \forall e \in E \quad (6),$$

$$\varphi \leq V_e, \forall e \in E \quad (7).$$

In Formula (6), $R_{(u, s)}$ represents a quantity of computing resources required for transmitting the user request (u, s), and $\varphi$ represents maximum load of a server. $V_e$ in Formula (7) represents maximum computing resource capacity of the MEC server node e. Formulas (6) and (7) can ensure that a total quantity of computing resources for processing a user request of each MEC server node cannot exceed the maximum load of the MEC node, and the maximum load of the MEC node cannot exceed the computing resource capacity of the node.

The spectrum resource occupation and uniqueness constraint is:

$$\sum_{e \in E, f \in F, (u,s) \in CR} w_{(u,s)(k,l)}^{e,f} \leq |F_{(k,l)}|, \forall (k,l) \in L \quad (8),$$

$$\sum_{f \in F} w_{(u,s)(k,l)}^{e,f} = \sum_{k \in K} x_{(u,s)}^{e,k} \times P_{(u,s),(k,l)}^{e,k} \times F_{(u,s)}, \forall (u,s) \in CR, e \in E, (k,l) \in L \quad (9),$$

$$\sum_{e \in E, (u,s) \in CR} w_{(u,s)(k,l)}^{e,f} \leq 1, \forall (k,l) \in L, f \in F \quad (10),$$

where $|F_{(k,l)}|$ represents a maximum spectrum slot quantity on the link (k, l), it is assumed that each link is allowed to provide the same maximum spectrum slot quantity, $P_{(u,s)(k,l)}^{e,k}$ represents an optical fiber link (k, l) through which the $k^{th}$ working path of transmitting the user request (u, s) from the node s to the MEC server node e passes, and $F_{(u, s)}$ represents a quantity of spectrum slots required for transmitting the user request (u, s). Formula (8) ensures that a quantity of spectrum slots occupied by each optical fiber link cannot exceed a total quantity of spectrum slots of the link. Formulas (9) and (10) ensure that a quantity of spectrum slots occupied by the user request (u, s) transmitted to the MEC server node on the optical fiber link (k, l) is equal to a quantity of spectrum slots required for the user request, and spectrum slot f of each link can only be occupied by one user request.

The spectrum continuity constraint is:

$$(w_{(u,s)(k,l)}^{e,f} - w_{(u,s)(k,l)}^{e,f+1} - 1) \times \\ (-\theta) \geq \Sigma_{z \in [f+2, |F_{(k,l)}|]} w_{(u,s)(k,l)}^{e,z} \quad (11),$$

$$(w_{(u,s)(k,l)}^{e,f} - 1) \times \theta + F_{(u,s)} \leq \Sigma_{f \in F} w_{(u,s)(k,l)}^{e,f} \forall (u,s) \in CR, (k,l) \in L, f \in F \quad (12),$$

$$\theta = |F_{(k,l)}| \times |L| \quad (13),$$

where θ represents a total spectrum quantity of the entire network, and is equal to a product of multiplying a total link quantity by link spectrum slot capacity, as shown in Formula (13). On a working path, spectrum slots allocated to each optical fiber link need to have continuity. In Formula (11), if $w_{(u,s)(k,l)}^{e,f}=1$ and $w_{(u,s)(k,l)}^{e,f+1}=0$, spectrum resources are allocated on the optical fiber link (k, l) in none of spectrum slots with an index value greater than f+1. In Formula (12), if $w_{(u,s)(k,l)}^{e,f}=1$, none of spectrum slots with an index value less than f is allocated to the optical fiber link (k, l). Therefore, Formulas (11) and (12) ensure the spectrum continuity constraint.

The spectrum continuity constraint is:

$$\Sigma_{f \in F} w_{(u,s)(k,l)}^{e,f} = F_{(u,s)}, \forall (u,s) \in CR, (k,l) \in L \quad (14).$$

The constraint condition (14) can ensure the consistency of spectrum resources. That is, for each user request, spectrum slots occupied by each link through which a working path passes have the same sequence number.

Through the foregoing constraint conditions, a resource allocation method based on computation offloading, routing, and spectrum allocation in a cloud-edge collaborative network may be found, to implement the joint optimized target function of the integer linear programming of the present invention.

Figure 2:
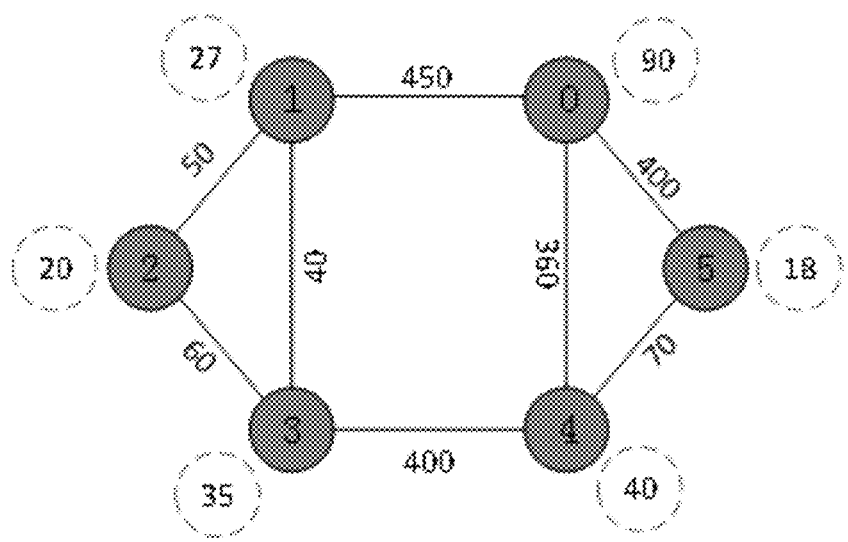
FIG. 2 shows a topological graph of a six-node network according to the present invention.

To further understand the optimization method provided in the present invention, specific implementations in the present invention are described below in detail with reference to related examples. Specific examples of steps are as follows:

The topological graph of the network shown in FIG. 2 is used as an example. The network is a cloud-edge collaborative network with six nodes and eight links. MEC server nodes e are represented by circles, and have sequence numbers 0, 1, 2, 3, 4, and 5. The node with a sequence number of 0 is a cloud server node. A number in a dashed circle next to a node represents the computing resource capacity of the server. Nodes are connected by an optical fiber link. Each optical fiber link is bidirectional. A number on a link represents the length of the link (the unit is km). It is set that each link includes 20 spectrum slot resources.

A set of user requests $CR=\{CR_1(0, 5), CR_2(1, 1)\}$ is generated in the cloud-edge collaborative network. Requirements of computation resources and spectrum resources of a user request are respectively $R_{(0, 5)}=5$, $R_{(1, 1)}=4$, $F_{(0, 5)}=2$, and $F_{(1,1)}=3$.

The target function of minimum average end-to-end delay and minimum spectrum slot occupation of a user request provided in the present invention is established and executed, referring to Formula (3).

The constraint conditions based on the joint optimization method for delay and spectrum occupation in a cloud-edge collaborative network provided in the present invention are established and executed. In a process of processing each user request, it is necessary to satisfy the node and path selection uniqueness constraint, referring to Formula 4 and Formula 5, the MEC server load constraint condition, referring to Formula 6 and Formula 7, the spectrum resource occupation and uniqueness constraint, referring to Formula 8 to Formula 10, the spectrum continuity constraint, referring to Formula 11 to Formula 13, and the spectrum continuity constraint, referring to FIG. 14.

Figure 3:
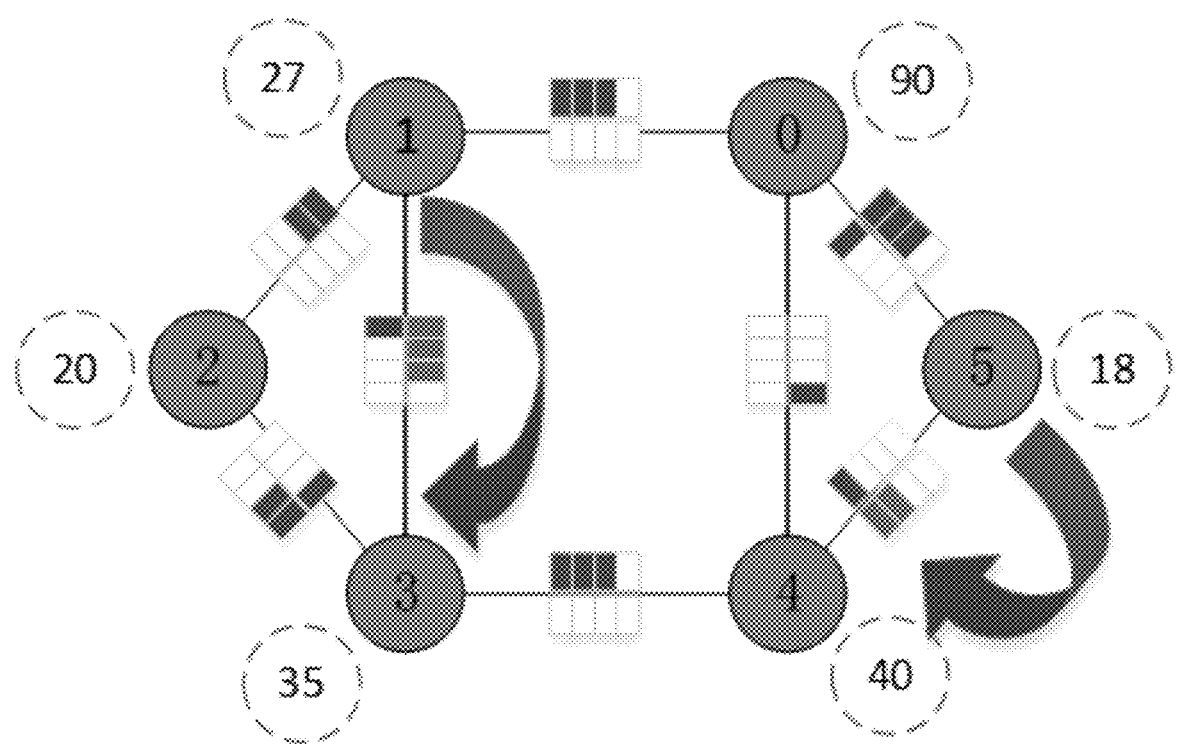
FIG. 3 is a schematic diagram of service processing in a cloud-edge collaborative network according to the present invention.

Through the foregoing steps, corresponding servers and spectrum resources may be allocated to the user requests $CR_1(0, 5)$ and $CR_2(1, 1)$ in the cloud-edge collaborative network based on a target condition. To achieve the target of minimum average end-to-end delay and minimum spectrum slot occupation of a user request, delay and spectrum slots are simultaneously considered during the selection of a server node to process a user request in the present invention. As shown in FIG. 3, one square on a link represents a spectrum slot. A red square represents that a spectrum slot is occupied. A white square represents that a spectrum slot is in an idle state. That is, the spectrum slot may be used to allocate a spectrum resource. According to the foregoing constraint conditions and target function, the user request $CR_1(0, 5)$ is transmitted to a node 4 for processing, the user request $CR_2(1, 1)$ is transmitted to a node 3 for processing, and spectrum slots of corresponding working paths are changed into green. As can be seen from FIG. 3, the foregoing constraint conditions may all be satisfied, and each working path has only one hop. Both the spectrum resource occupation and delay are relatively low.

Embodiment 2

Based on the same inventive concept, this embodiment provides a joint optimization system for delay and spectrum occupation in a cloud-edge collaborative network. The principle of solving the problems is similar to that of the joint optimization method for delay and spectrum occupation in a cloud-edge collaborative network. Details are not repeated.

This embodiment further provides a joint optimization system for delay and spectrum occupation in a cloud-edge collaborative network, including:

an initialization module, configured to initialize a cloud-edge collaborative network, and generate a set of user requests;

a modeling module, configured to establish a target function of minimum average end-to-end delay and minimum spectrum slot occupation of a user request;

a determination module, configured to sequentially determine, during processing of each user request based on the target function, whether a node and path selection uniqueness constraint, a MEC server load constraint, a spectrum resource occupation and uniqueness constraint, a spectrum continuity constraint, and a spectrum consistency constraint are satisfied, where if all the constraints are satisfied, the user request is successfully processed, and the process turns to step S4; or if any constraint is not satisfied, the user request fails to be processed; and a calculation module, configured to calculate average end-to-end delay and spectrum resource occupancy of the user request.

A person skilled in the art should understand that the embodiments of the present application may be provided as a method, a system or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the protection scope of the invention of the present invention.

What is claimed is:

1. A joint optimization method for delay and spectrum occupation in a cloud-edge collaborative network, comprising steps of:
   step S1: initializing the cloud-edge collaborative network, and generating a set of user requests;
   step S2: establishing a target function of minimum average end-to-end delay and minimum spectrum slot occupation of a user request;
   step S3: during processing of each said user request based on the target function, sequentially determining whether a node and path selection uniqueness constraint, a mobile edge computing (MEC) server load constraint, a spectrum resource occupation and uniqueness constraint, a spectrum continuity constraint, and a spectrum consistency constraint are satisfied, wherein if all constraints are satisfied, proceed to step S4; or if any constraint is not satisfied, the user request fails to be processed; and
   step S4: calculating average end-to-end delay and spectrum resource occupancy of the user request.

2. The joint optimization method for delay and spectrum occupation in the cloud-edge collaborative network according to claim 1, wherein during the initialization of the cloud-edge collaborative network, computing resources of an edge computing server are initialized, and a spectrum-flexible optical network is initialized.

3. The joint optimization method for delay and spectrum occupation in the cloud-edge collaborative network according to claim 1, wherein the target function comprises a primary optimization target and a secondary optimization target.

4. The joint optimization method for delay and spectrum occupation in the cloud-edge collaborative network according to claim 1, wherein a formula of the target function is $$G = \alpha \times \frac{1}{|CR|} \left\{ \sum_{(u,s) \in CR}^{e \in E, k \in K} x_{(u,s)}^{e,k} \left( \frac{R_{(u,s)}}{M_e} + \frac{W_{(u,s),(k,l)}^{e,k}}{c} \right) + \sum_{(u,s) \in CR} y_{(u,s)} \times \tau \right\} + \beta \times \sum_{(k,l) \in L, f \in F}^{e \in E, (u,s) \in CR} w_{(u,s)(k,l)}^{e,f},$$

wherein |CR| represents a total quantity of the set of user requests, and CR is a second set of user requests; $x_{(u,s)}^{e,k}$ is a binary variable, if a user request (u, s) is processed at a MEC server node e and the user request is transmitted through a $k^{th}$ path, wherein E represents a set of MEC servers, a value of the binary variable is 1, or otherwise the value is 0; $R_{(u,s)}$ represents a quantity of computing resources required for transmitting the user request (u, s); $M_e$ is a computing resource capability of the MEC server node e; $W_{(u,s),(k,l)}^{e,k}$ presents a distance of a link (k, l) through which a $k^{th}$ working path of transmitting the user request (u, s) from a node s to the MEC server node e, $\Sigma_{e \in E, k \in K} x_{(u,s)}^{e,k} = 1$, $\forall (u,s) \in CR$, $\Sigma_{e \in E, k \in K} x_{(u,s)}^{e,k} = y_{(u,s)}$, $\forall (u, s) \in CR$, and K represents a set of k paths; c represents a transmission rate of the user request in an optical fiber link, and is set to $3 \times 10^5$ km/s; and $y_{(u,s)}$ is a binary variable, if the user request (u, s) is migrated to a second layer, that is, a MEC server node e in a cloud area for processing, a value of the binary variable is 1, or otherwise the value is 0; $\tau$ is extra switch delay of transmitting the user request to the cloud area through a switch, $\alpha$ and $\beta$ are parameters, $w_{(u,s)(k,l)}^{e,f}$ is a binary variable, and if the user request (u, s) is transmitted to the MEC server node e and a spectrum slot with a sequence number off of the link (k, l) is occupied, a value of the binary variable is 1, or otherwise the value is 0.

5. The joint optimization method for delay and spectrum occupation in the cloud-edge collaborative network according to claim 4, wherein the node and path selection uniqueness constraint is:

$$\Sigma_{e \in E, k \in K} x_{(u,s)}^{e,k} = 1, \forall (u,s) \in CR, \Sigma_{e \in E, k \in K} x_{(u,s)}^{e,k} = y_{(u,s)},$$
$$\forall (u,s) \in CR,$$

wherein $x_{(u,s)}^{e,k}$ a binary variable, if the user request (u, s) is processed at the MEC server node e and the user request is transmitted through the $k^{th}$ path, a value of the binary variable is 1, or otherwise the value is 0, $y_{(u,s)}$ is a binary variable, and if the user request (u, s) is migrated to the second layer, that is, the MEC server node e in the cloud area for processing, a value of the binary variable is 1, or otherwise the value is 0.

6. The joint optimization method for delay and spectrum occupation in the cloud-edge collaborative network according to claim 4, wherein the MEC server load constraint is $\Sigma_{(u,s)\in CR, k\in K} x_{(u,s)}^{e,k} \times R_{(u,s)} \leq \varphi, \forall e\in E, \varphi \leq V_e, \forall e\in E$, wherein $R_{(u,s)}$ represents the quantity of computing resources required for transmitting the user request (u, s), $\varphi$ represents a maximum load of a server, and $V_e$ represents maximum computing resource capacity of the MEC server node e.

7. The joint optimization method for delay and spectrum occupation in the cloud-edge collaborative network according to claim 4, wherein the spectrum resource occupation and uniqueness constraint is:

$\Sigma_{e\in E, f\in F, (u,s)\in CR} w_{(u,s)(k,l)}^{e,f} \leq |F_{(k,l)}|, \forall (k,l)\in L;$ $\Sigma_{f\in F} w_{(u,s)(k,l)}^{e,f} = \Sigma_{k\in K} x_{(u,s)}^{e,k} \times P_{(u,s),(k,l)}^{e,k} \times F_{(u,s)}, \forall (u,s) \in CR, e\in E, (k,l)\in L;$ $\Sigma_{e\in E, (u,s)\in CR} w_{(u,s)(k,l)}^{e,f} \leq 1, \forall (k,l)\in L, f\in F,$ wherein $|F_{(k,l)}|$ represents a maximum spectrum slot quantity on the link (k, l), it is assumed that each link is allowed to provide the same maximum spectrum slot quantity, $P_{(u,s),(k,l)}^{e,k}$ represents an optical fiber link (k, l) through which the $k^{th}$ working path of transmitting the user request (u, s) from the node s to the MEC server node e passes, and $F_{(u,s)}$ represents a quantity of spectrum slots required for transmitting the user request (u, s).

8. The joint optimization method for delay and spectrum occupation in the cloud-edge collaborative network according to claim 7, wherein the spectrum continuity constraint is:

$(w_{(u,s)(k,l)}^{e,f} - w_{(u,s)(k,l)}^{e,f+1} - 1) \times (-\theta) \geq \Sigma_{z\in[f+2,|F_{(k,l)}|]} w_{(u,s)(k,l)}^{e,z},$ $(w_{(u,s)(k,l)}^{e,f} - 1) \times \theta + F_{(u,s)} \leq \Sigma_{f\in F} w_{(u,s)(k,l)}^{e,f}, \forall (u,s)\in CR, (k,l)\in L, f\in F;$ $\theta = |F_{(k,l)}| \times |L|$, wherein $\theta$ represents a total spectrum quantity of the entire network, and is equal to a product of multiplying a total link quantity by link spectrum slot capacity.

9. The joint optimization method for delay and spectrum occupation in the cloud-edge collaborative network according to claim 4, wherein the spectrum continuity constraint is $\Sigma_{f\in F} w_{(u,s),(k,l)}^{e,f} = F_{(u,s)}, \forall (u,s)\in CR, (k,l)\in L,$ wherein $F_{(u,s)}$ represents a quantity of spectrum slots required for transmitting the user request (u, s).

10. A joint optimization system for delay and spectrum occupation in a cloud-edge collaborative network, comprising:
   an initialization module, configured to initialize the cloud-edge collaborative network, and generate a set of user requests;
   a modeling module, configured to establish a target function of minimum average end-to-end delay and minimum spectrum slot occupation of a user request;
   a determination module, configured to sequentially determine, during processing of each user request based on the target function, whether a node and path selection uniqueness constraint, a mobile edge computing (MEC) server load constraint, a spectrum resource occupation and uniqueness constraint, a spectrum continuity constraint, and a spectrum consistency constraint are satisfied, wherein if all constraints are satisfied, the user request is successfully processed, proceed to a calculation step listed below; or if any constraint is not satisfied, the user request fails to be processed; and
   a calculation module, configured to calculate average end-to-end delay and spectrum resource occupancy of the user request.

* * * * *